(12) United States Patent
Huang

(10) Patent No.: US 8,299,358 B2
(45) Date of Patent: Oct. 30, 2012

(54) OUTLET OR SWITCH PANEL

(76) Inventor: Huadao Huang, Yueqing (CN)

( * ) Notice: Subject to any disclaimer, the term of this patent is extended or adjusted under 35 U.S.C. 154(b) by 191 days.

(21) Appl. No.: 12/830,369

(22) Filed: Jul. 5, 2010

(65) Prior Publication Data

US 2011/0048760 A1 Mar. 3, 2011

(30) Foreign Application Priority Data

Aug. 27, 2009 (CN) ...................... 2009 2 0173441 U

(51) Int. Cl.
*H02G 3/14* (2006.01)

(52) U.S. Cl. ............ 174/66; 174/67; 220/241; 220/242; 439/536

(58) Field of Classification Search ...................... 174/66, 174/67, 17 CT, 50, 53, 57, 58; 220/3.2, 3.3, 220/241, 242, 3.8; 439/536, 142, 135, 148, 439/149; D13/156, 177; D8/353
See application file for complete search history.

(56) References Cited

U.S. PATENT DOCUMENTS

| 4,835,343 A | * | 5/1989 | Graef et al. | ..................... 174/66 |
| 5,073,681 A | * | 12/1991 | Hubben et al. | .................. 174/66 |
| 5,895,888 A | * | 4/1999 | Arenas et al. | ................... 174/66 |
| 6,278,062 B1 | * | 8/2001 | Sowdon | .......................... 174/66 |
| 6,840,800 B2 | * | 1/2005 | Kidman | ............................ 174/66 |
| 7,030,319 B2 | * | 4/2006 | Johnsen et al. | ................. 174/66 |
| 7,071,414 B2 | * | 7/2006 | Kim | ................................ 174/66 |
| 7,279,636 B2 | * | 10/2007 | Oddsen et al. | .................. 174/66 |
| 7,456,358 B2 | * | 11/2008 | Swiencicki et al. | ............ 174/66 |
| 7,538,271 B2 | * | 5/2009 | O'Young et al. | ................ 174/66 |
| 7,947,903 B2 | * | 5/2011 | Peck | ............................... 174/66 |
| 8,101,860 B1 | * | 1/2012 | Shotey et al. | ................... 174/66 |

* cited by examiner

*Primary Examiner* — Angel R Estrada
(74) *Attorney, Agent, or Firm* — Mei & Mark LLP

(57) ABSTRACT

A panel for mounting to a power outlet or switch comprises a panel holder configured to secure to the power outlet or switch. A slide lock is configured to clip onto the panel holder in a sliding way. A panel case is configured to clip to the slide lock. The panel case is secured to the panel holder through the slide lock.

15 Claims, 4 Drawing Sheets

OUTLET OR SWITCH PANEL

This application claims the benefit of priority of Chinese patent application 200920173441.6, filed Aug. 27, 2009, the content of which is incorporated herein by reference in its entirety.

TECHNICAL FIELD

The present disclosure relates generally to wall or floor mounted power outlets and switches. More specifically, an exterior panel and its mounting system for a switch or outlet is proposed.

BACKGROUND

Current power outlets and switches have panels mounted at their surfaces to make the surface of the outlet or switch look more beautiful and decent. The panel is usually secured to the power outlet or switch through screws or tongue-and-slot clips, which are not easy to disassemble. In addition, sometimes the panel grabs may be broken due to improper force, which may also damage the exterior surface of the outlet or switch.

SUMMARY

Applicant proposes a new panel to be mounted on the surface of a power outlet or switch. The panel is characterized by its simple structure, disassembly convenience, and beautiful appearance.

In one embodiment, a panel for mounting to a power outlet or switch, comprises a panel holder configured to secure to the power outlet or switch. A slide lock is configured to clip onto the panel holder in a sliding way. A panel case is configured to clip to the slide lock. The panel case is secured to the panel holder through the slide lock.

The panel has the advantages of a simple structure, assembly and disassembly convenience, a simple molding process, and a low cost. In addition, the panel can be used in conjunction with various standard power outlets and switches conveniently, and is convenient for the electrician to install and remove.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention.

DETAILED DESCRIPTION

Reference will now be made in detail to the present exemplary embodiments, examples of which are illustrated in the accompanying drawings. Wherever possible, the same reference numbers will be used throughout the drawings to refer to the same or like parts.

Figure 1:
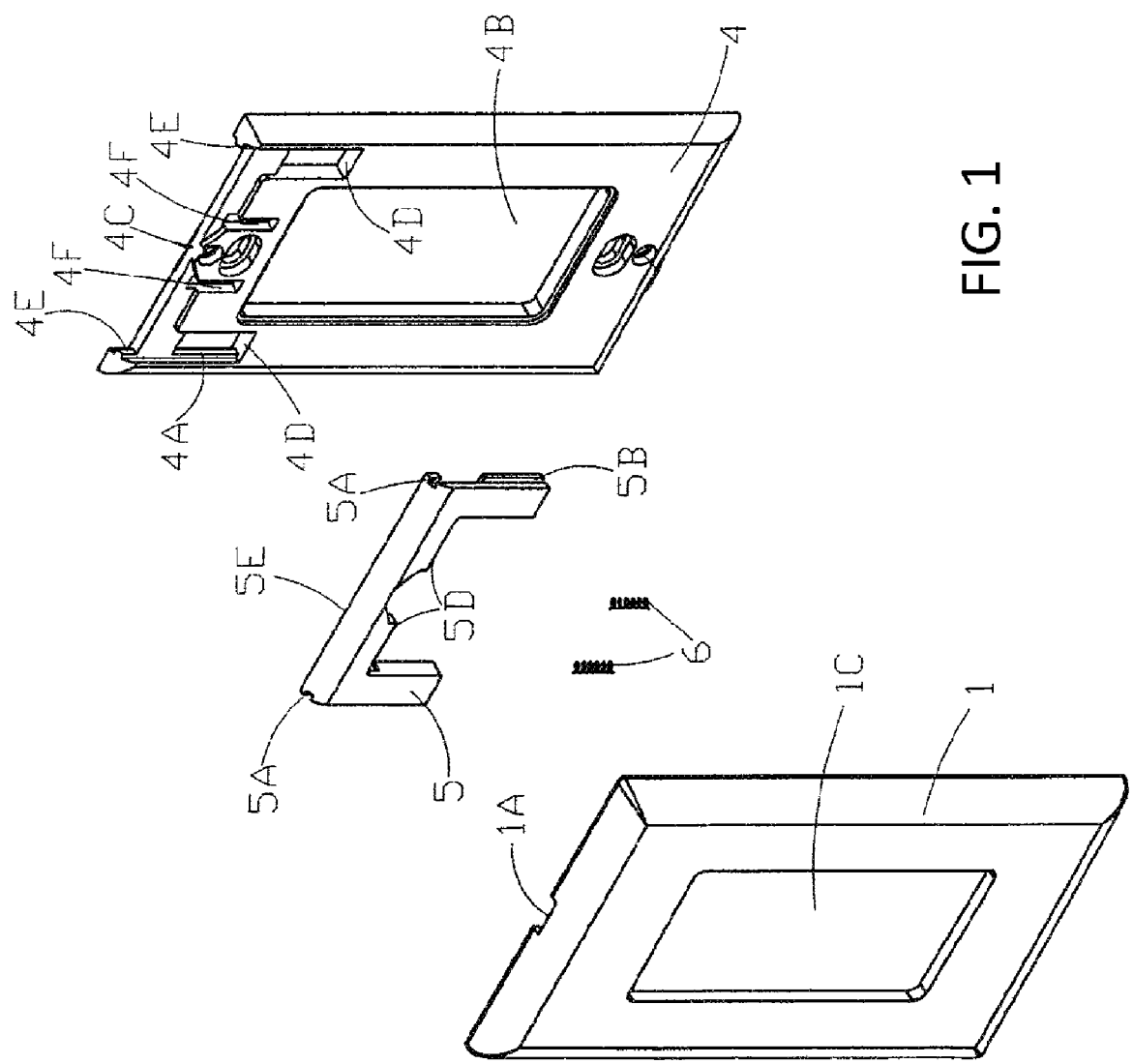
FIG. 1 is an example of a front view structural breakdown diagram of a panel.
Figure 2:
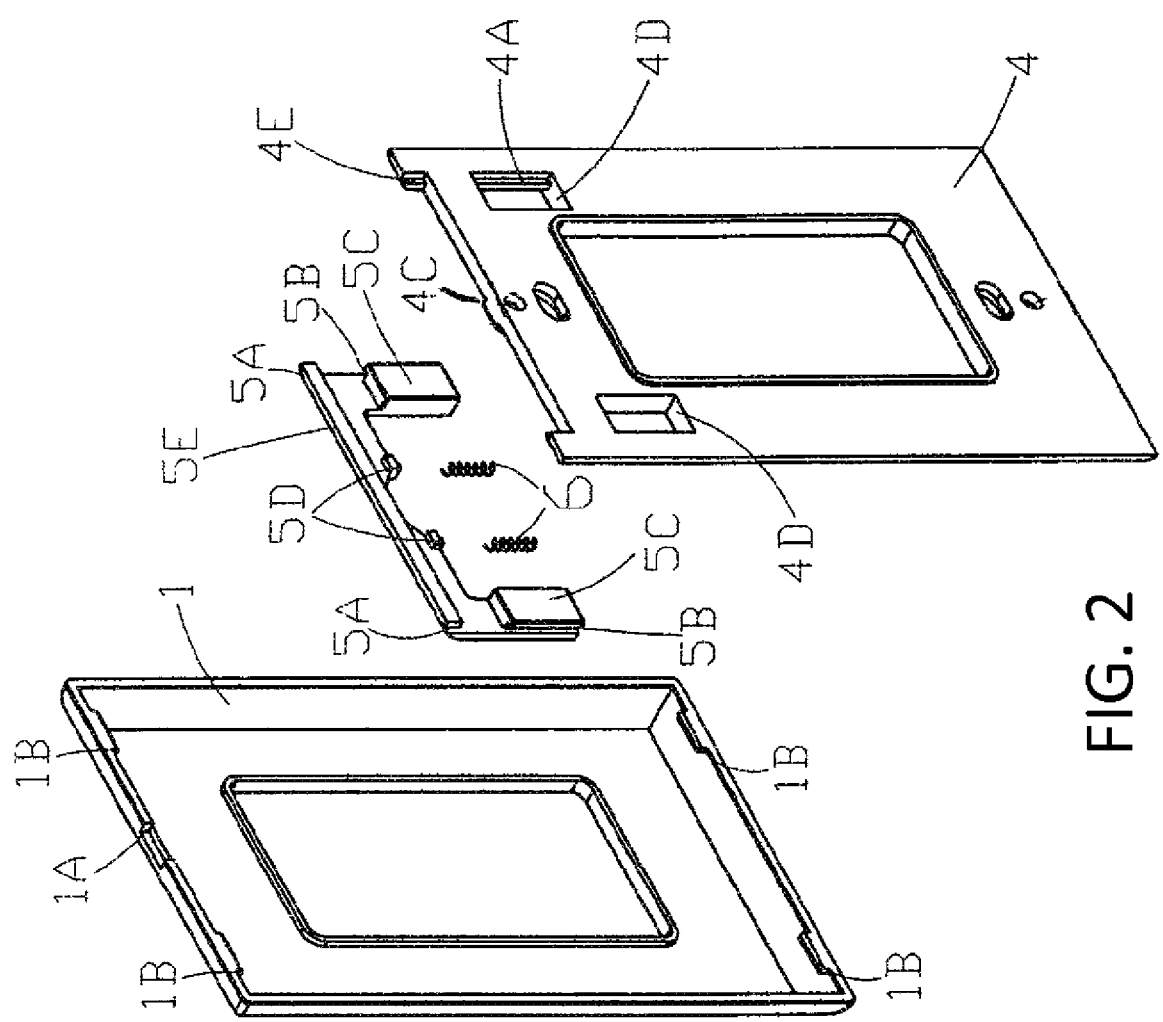
FIG. 2 is an example of a rear view structural breakdown diagram of a panel.

As shown in FIGS. 1 and 2, the panel includes panel case 1, slide lock 5 and panel holder 4. The panel holder 4 is secured through screws to the power outlet/switch body in the wall, and is mounted along with it in the box 10. The slide lock 5 is clipped onto the panel holder 4 in a sliding way. The panel case 1 is clipped to the slide lock 5. The panel case 1 is secured to the panel holder 4 through the slide lock 5.

As shown in FIGS. 1 and 2, the surface of the panel case 1 is smooth, with a through hole 1C opened in it. This through hole 1C is sized and shaped to expose only the power sockets or switches on the surface after the panel case 1 is clipped to the panel holder 4 through slide lock 5, while not affecting the service capability of the power sockets or switches. A press opening 1A is provided in the middle of the top wall of the panel case 1. Clip blocks 1B are provided at the rear top and rear bottom of the panel case 1 respectively. The clip block 1B at the rear top of the panel case 1 matches with the slide lock 5, and the clip block 1B at the rear bottom of the panel case 1 matches with the bottom of the panel holder 4 so that the panel case 1, panel holder 4 and slide lock 5 are clipped together tightly.

A press plate 5E is provided in the rear of slide lock 5. A clip block 5C is provided at the left and right sides in the rear of the slide lock 5 respectively. Slide slots 5A are provided in the left and right walls of the pressing plate 5E. Similarly, a slide slot 5B is provided in the side wall of the clip block 5C.

A through hole 4B is provided in the middle of the said panel holder 4. This through hole 4B is sized to expose only the power sockets or switches on the surface after the panel holder 4 is secured to the grounding mounting plate 7 of the power outlet 8 through screws 3, while not affecting the service.

A breach 4C is provided at the end of the said panel holder 4. Slideway 4E is provided in the left and right inner wall of the breach 4C. In the left and right sides of the panel holder 4, corresponding to the left and right clip block 5C of the slide lock 5, clip block holes 4D are provided respectively. Slideway 4A is provided in the inner wall of the clip block hole 4D.

When the slide lock 5 is clipped with the panel holder 4, the slideway 5B in the two sides of the clip block 5C of the slide lock 5 slides in the slideway 4A of the clip block hole 4D of the panel holder 4, making the clip block 5C of the slide lock 5 be clipped in the clip block hole 4D of the panel holder 4. Similarly, the slideway 5A in the two sides of the press plate 5E of the slide lock 5 slides in the slideway 4E of the breach 4C of the panel holder 4, making the press plate 5E of the slide lock 5 be clipped to the panel holder 4.

To facilitate the assembly and disassembly of the panel case 1, slide lock 5 and panel holder 4, and as shown in FIGS. 1 and 2, the panel also includes a pair of springs 6. A pair of mounting slots 4F is provided on panel holder 4 for accommodating the springs 6. A pair of tongues 5D is provided on the slide lock 5 for fixing the springs 6. The springs 6 are located in the mounting slots 4F on the panel holder 4, with one end resting against the tongues 5D of the slide lock 5 and with the other end resting in the mounting slots 4F of the panel holder 4.

Figure 3:
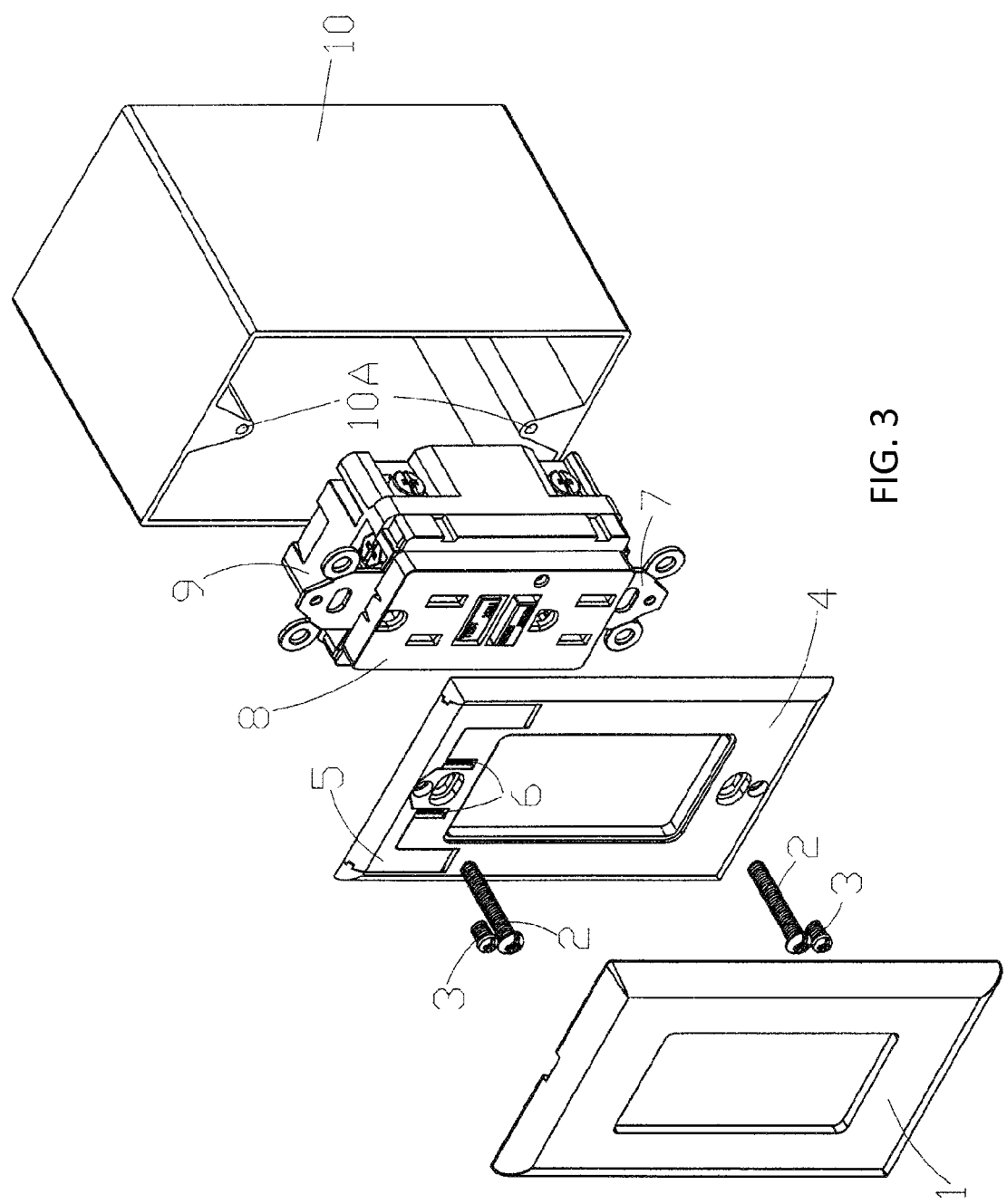
FIG. 3 is an example of a structural breakdown diagram of a panel in an in-service state.
Figure 4:
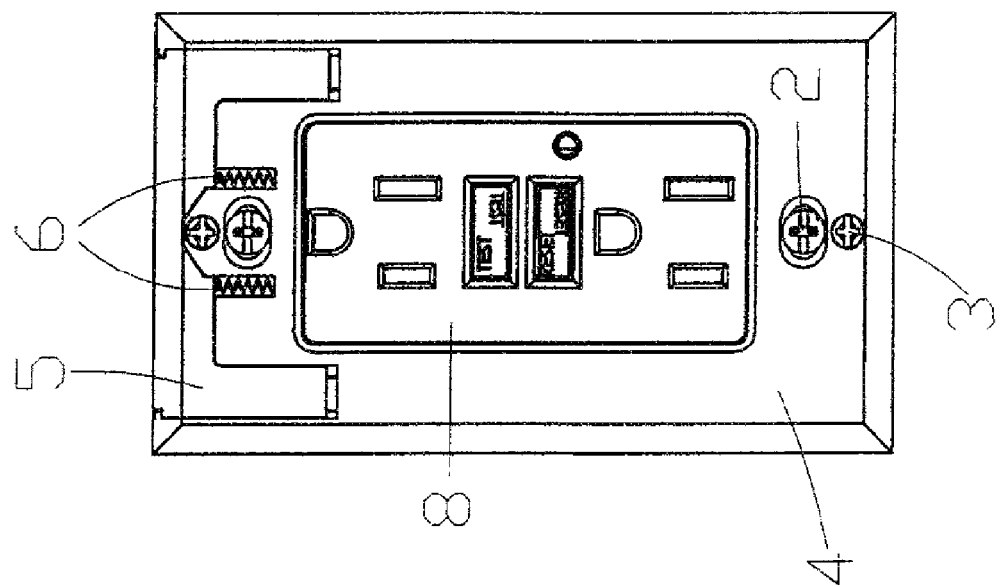
FIG. 4 is an example of a front view of an assembled panel holder, slide lock, and power outlet.

As shown in FIGS. 3 and 4, before the power outlet or switch is released from the factory, the panel holder 4, slide lock 5 and springs 6 are assembled together. They are mounted to the power outlet or switch body metal grounding mounting plate 7 with screws 3. And then, the panel case 1, slide lock 5 and panel holder 4 are clipped together. In addition, the panel case 1, panel holder 4, slide lock 5, and springs 6 can be released to market together for retrofitting to various standard power outlets or switches.

When an electrician installs the panel, he shall firstly disassemble the panel case 1 from the panel, connect the panel holder 4 and slide lock 5 toward the power outlet, and secure it into the mounting box 10 in the wall through screws 2. Finally, he shall cover the panel case 1 onto the slide lock 5, making the clip block 1B of the panel case 1 be clipped on the press plate 5E of the slide lock 5. Under the stretching action of the springs 6, the panel case 1, slide lock 5 and panel holder 4 are clipped closely together.

When it is necessary to disassemble the panel case 1, push the press opening 1A of the panel case 1 gently toward the slide block 5 with an object such as a small screwdriver, thereby making the springs 6 contract. Then the clip block 1B of the panel case 1 can be separated from the press plate 5E of the slide lock 5 and the panel holder 4, allowing the panel case 1 to be disassembled.

1: Panel case;
1A: Press opening;
1B: Clip block;
1C: Through hole;
2: Screw;
3: Thread;
4: Panel holder;
4B: Through hole;
4C: Breach;
4A: Slideway;
4D: Clip block hole;
4E: Slideway;
4F: Mounting slot;
5: Slide lock;
5A, 5B: Slideway;
5D: Tongue;
5E: Press plate;
6: Spring;
7: Metal grounding mounting plate;
8, 9: Power outlet body;
10: Mounting box;
10A: Mounting hole.

In the preceding specification, various preferred embodiments have been described with reference to the accompanying drawings. It will, however, be evident that various other modifications and changes may be made thereto, and additional embodiments may be implemented, without departing from the broader scope of the invention as set forth in the claims that follow. The specification and drawings are accordingly to be regarded in an illustrative rather than restrictive sense.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

I claim:

1. A panel for mounting to a power outlet or switch, comprising:
    a panel holder configured to secure to the power outlet or switch;
    a slide lock configured to clip onto the panel holder in a sliding way;
    springs or elastic metal sheets mounted between the panel holder and the slide lock; and
    a panel case configured to clip to the slide lock,
    wherein the panel case is secured to the panel holder through the slide lock.

2. The panel of claim 1, wherein the panel case comprises:
    a smooth upper surface, the upper surface comprising at least one through hole configured to expose the power outlet or switch;
    a top wall with a middle portion and a press opening in the middle portion of the top wall; and
    a panel case rear surface with panel case clip blocks,
    wherein the panel case clip blocks match with the slide lock and the panel holder so as to clip together the panel case, the slide lock, and the panel holder.

3. The panel of claim 2, wherein the slide lock further comprises:
    a slide lock rear surface and a press plate on the slide lock rear surface, the press plate further comprising left and right press plate walls each comprising press plate slide slots; and
    left and right rear surface slide lock walls each comprising a slide lock clip block, each slide lock clip block comprising a slide lock clip block side wall with a slide lock clip block slide slot.

4. The panel of claim 3, wherein the panel holder further comprises:
    a middle portion with a panel holder through hole configured to expose the power outlet or switch;
    an end portion with a breach, the breach comprising left and right inner breach walls, the left and right inner breach walls each comprising a breach slideway; and
    left and right panel holder sides each having panel holder clip block holes, the panel holder clip block holes each having a clip block inner wall with a clip block slideway,
    wherein the left and right panel holder sides respectively correspond to the left and right slide block clip blocks.

5. The panel of claim 4, further comprising a pair of springs, each spring having a first end and a second end, wherein:
    the panel holder further comprises a pair of mounting slots, the mounting slots each comprising a spring fixing position at an end of the slot; and
    the slide lock further comprises a pair of tongues,
    wherein the pair of springs are respectively located in the pair of mounting slots such that the first end of each spring rests against the tongues and the second end of each spring rests against the spring fixing positions.

6. The panel of claim 2, wherein the panel case, the slide lock, and the panel holder each comprise an insulating material.

7. The panel of claim 2, wherein:
    the panel holder further comprises a bottom surface,
    the rear panel case surface further comprises a rear top and a rear bottom,
    the panel case clip blocks further comprise a rear top clip block on the rear top and a rear bottom clip block on the rear bottom, and
    the rear top clip block mates with the slide lock and the rear bottom clip block mates with the bottom surface of the panel holder.

8. The panel of claim 2, wherein, when the slide lock is integrated with the panel holder, the slide lock slides from a first position to a second position to clip the panel case to the panel holder, and the slide lock slides from the second position to the first position to separate the panel case from the panel holder.

9. A panel for mounting to a power outlet or switch, comprising:
    a panel holder configured to secure to the power outlet or switch;

a slide lock configured to clip onto the panel holder in a sliding way; and a panel case configured to clip to the slide lock, wherein:

the panel case is secured to the panel holder through the slide lock, the panel case comprises:

a smooth upper surface, the upper surface comprising at least one through hole configured to expose the power outlet or switch;

a top wall with a middle portion and a press opening in the middle portion of the top wall; and a panel case rear surface with panel case clip blocks, and wherein the panel case clip blocks match with the slide lock and the panel holder so as to clip together the panel case, the slide lock, and the panel holder.

10. The panel of claim 9, wherein the slide lock further comprises:

a slide lock rear surface and a press plate on the slide lock rear surface, the press plate further comprising left and right press plate walls each comprising press plate slide slots; and left and right rear surface slide lock walls each comprising a slide lock clip block, each slide lock clip block comprising a slide lock clip block side wall with a slide lock clip block slide slot.

11. The panel of claim 10, wherein the panel holder further comprises:

a middle portion with a panel holder through hole configured to expose the power outlet or switch;

an end portion with a breach, the breach comprising left and right inner breach walls, the left and right inner breach walls each comprising a breach slideway; and left and right panel holder sides each having panel holder clip block holes, the panel holder clip block holes each having a clip block inner wall with a clip block slideway, wherein the left and right panel holder sides respectively correspond to the left and right slide block clip blocks.

12. The panel of claim 11, further comprising a pair of springs, each spring having a first end and a second end, wherein:

the panel holder further comprises a pair of mounting slots, the mounting slots each comprising a spring fixing position at an end of the slot; and the slide lock further comprises a pair of tongues, wherein the pair of springs are respectively located in the pair of mounting slots such that the first end of each spring rests against the tongues and the second end of each spring rests against the spring fixing positions.

13. The panel of claim 9, wherein the panel case, the slide lock, and the panel holder each comprise an insulating material.

14. The panel of claim 9, wherein:

the panel holder further comprises a bottom surface, the rear panel case surface further comprises a rear top and a rear bottom, the panel case clip blocks further comprise a rear top clip block on the rear top and a rear bottom clip block on the rear bottom, and the rear top clip block mates with the slide lock and the rear bottom clip block mates with the bottom surface of the panel holder.

15. The panel of claim 9, wherein, when the slide lock is integrated with the panel holder, the slide lock slides from a first position to a second position to clip the panel case to the panel holder, and the slide lock slides from the second position to the first position to separate the panel case from the panel holder.

* * * * *